May 9, 1939.  C. F. MENDEZ  2,157,138
METHOD OF AND APPARATUS FOR PRODUCING STEREOSCOPIC PICTURES
Filed July 8, 1936  2 Sheets-Sheet 1
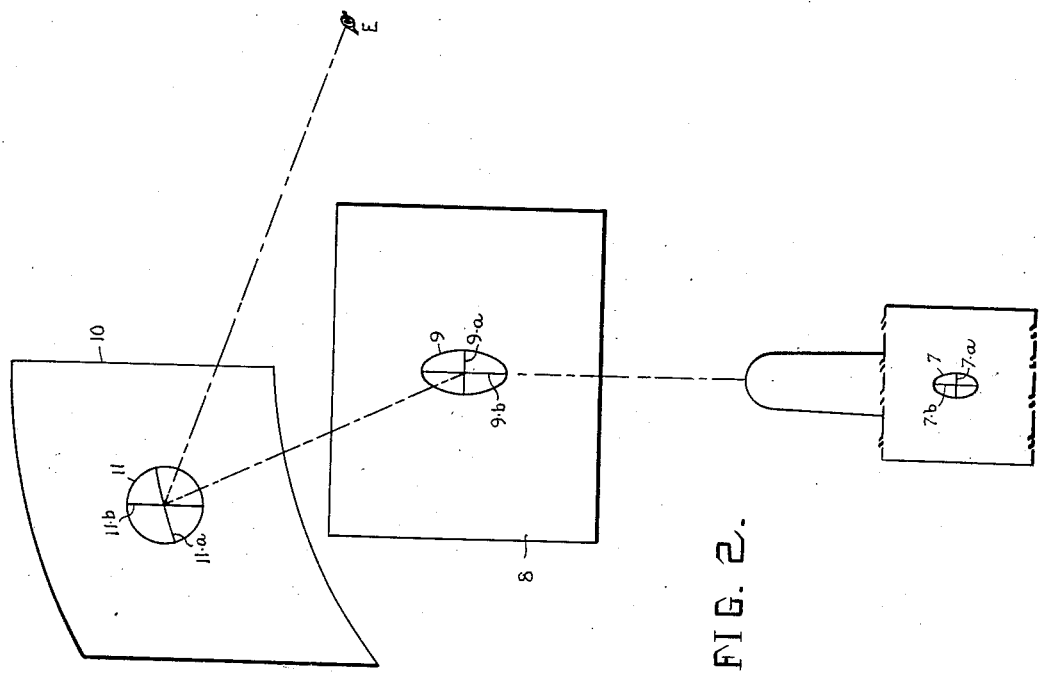
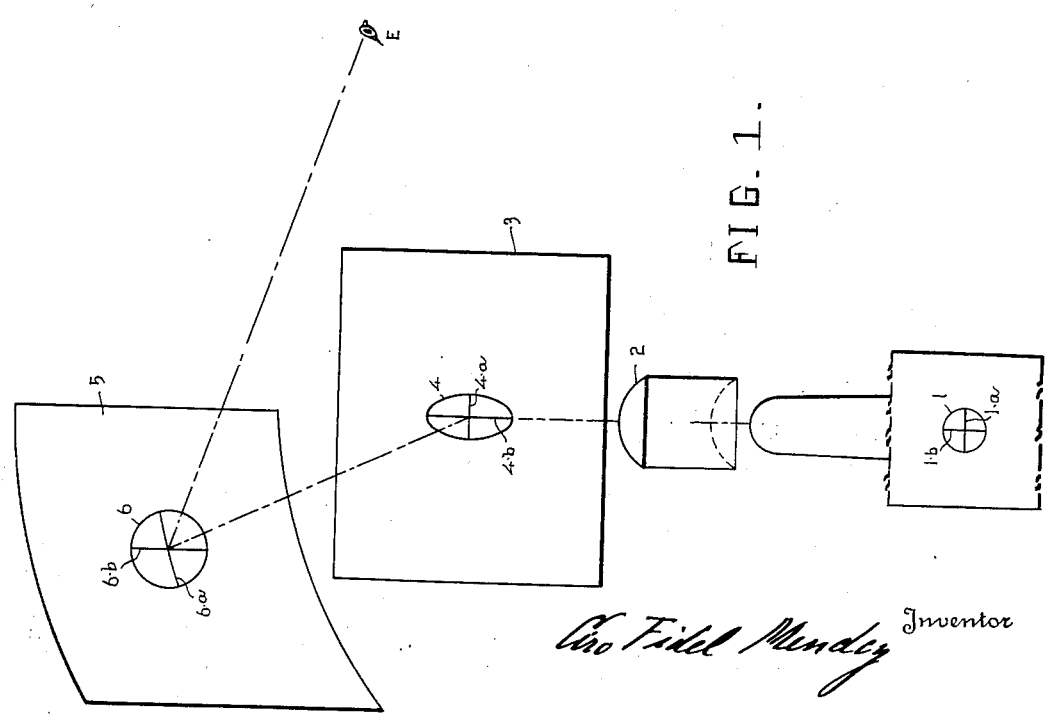

May 9, 1939.  C. F. MENDEZ  2,157,138
METHOD OF AND APPARATUS FOR PRODUCING STEREOSCOPIC PICTURES
Filed July 8, 1936  2 Sheets-Sheet 2
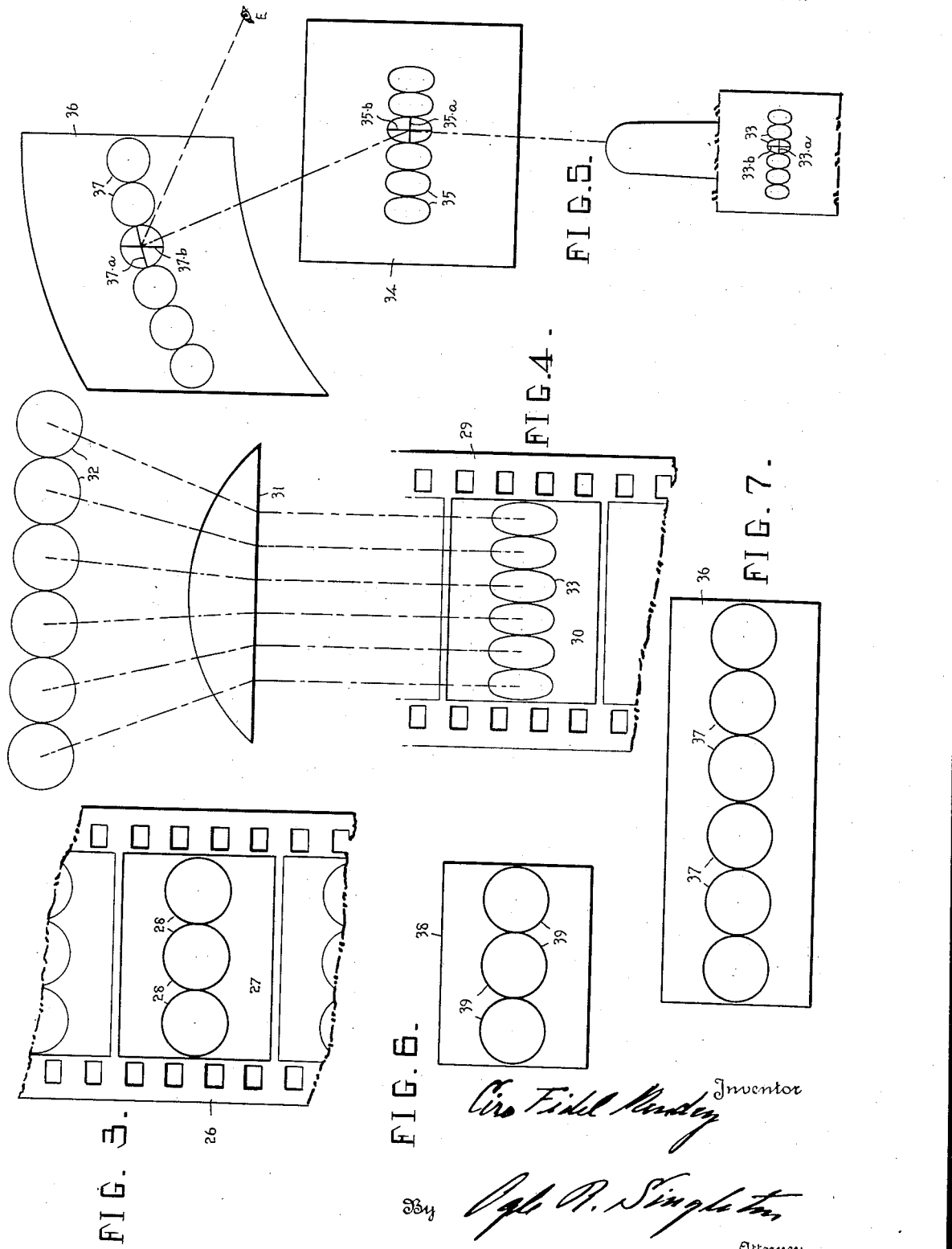

Patented May 9, 1939

2,157,138

UNITED STATES PATENT OFFICE 2,157,138

METHOD OF AND APPARATUS FOR PRODUCING STEREOSCOPIC PICTURES

Ciro Fidel Mendez, Mexico, D. F., Mexico

Application July 8, 1936, Serial No. 89,607

2 Claims. (Cl. 88—16.6)

My invention consists of a new and useful improvement in Method of and apparatus for producing stereoscopic pictures and is an improvement upon my invention described and claimed in my co-pending application for United States Letters Patent, Serial Number 69,195, filed March 16, 1936. In my aforesaid invention, the stereoscopic effect is procured by the use of a concave reflecting surface generated by a line moving in an arcuate path disposed in a substantially horizontal plane. Such a surface produces a degree of objectionable distortion, and it is to correct such distortion that my present invention is designed. Essentially, my invention consists in producing stereoscopic pictures by the use of a concave reflecting surface causing horizontal distortion, and vertically distorting the images, either before or after their horizontal distortion, to compensate for the necessary horizontal distortion, and thereby produce symmetrical images. As hereinafter fully described, the result can be accomplished in a variety of ways. The pictures may be initially vertically distorted, either by photographing with a proper form of lens, in reproducing the prints or films with such a lens, or by projection with such a lens. When such vertically distorted pictures are reflected from the concave surface the observed pictures will be symmetrical.

My invention also makes possible the horizontal increase of the effective photographic field of a standard photographic film, since the pictures may be vertically distorted, as above mentioned in the photographing, permitting a greater photographic area to be placed within the limits of the film, and subsequently horizontally distorted, to restore symmetry.

While I have illustrated in the drawings filed herewith and have hereinafter fully described several embodiments of my invention, it is to be distinctly understood that I do not consider my invention limited to said specific embodiments, but refer for its scope to the caims appended hereto.

In the drawings:

Fig. 1 is a diagrammatic illustration of that form of my invention in which the proper form of lens is used in the projection of the pictures, to distort the initial images vertically.

Fig. 2 is a diagrammatic illustration of that form of my invention in which the vertical distortion of the images is secured in the original picture by the use of the proper form of lens either in photographic or printing the picture.

Fig. 3 is a diagrammatic illustration of a portion of a standard motion picture film.

Fig. 4 is a diagrammatic illustration of the initial step in that form of my invention in which the effective photographic field is horizontally increased, showing the vertical distortion of images in the field, by the use of the proper form of lens.

Fig. 5 is a diagrammatic illustration of the second step showing the corresponding horizontal distortion of the images reflected from the concave surface, thereby restoring symmetry.

Fig. 6 is a diagrammatic illustration of the image projected upon the observed surface, by the usual method of projection of a standard film such as is illustrated in Fig. 3.

Fig. 7 is a diagrammatic illustration of the images projected upon the observed surface, by the use of my invention illustrated in Figs. 4 and 5.

As illustrated in Fig. 1, the image 1 shown as a circle having the horizontal and vertical diameters 1a and 1b is projected through the lens 2 upon the translucent screen 3. By reason of the character of the lens 2, the image 4 caused to appear upon the screen 3 is distorted vertically, its horizontal diameter 4a being the same as the horizontal diameter 1a, but its vertical diameter 4b being greater than the vertical diameter 1b. The reflecting surface 5, because of the character of its surface causing horizontal distortion, reflecting the image 4 produces the image 6 having the horizontal diameter 6a greater than the horizontal diameter 4a and the vertical diameter 6b the same as the vertical diameter 4b. Since the lens 2 and the reflecting surface 5 are designed to effect the corresponding degrees of vertical and horizontal distortion respectively, it is obvious that the horizontal and vertical diameters 6a and 6b of the image 6 are identical, thus producing a circle, whereby the requisite horizontal distortion of the reflecting surface 5 has been compensated to produce a symmetrical image 6, as observed by the eye E.

As illustrated in Fig. 2, the image 7 a circle having been initially distorted vertically in its production by the use of the proper form of lens, has the horizontal diameter 7a and the increased vertical diameter 7b, and is projected upon the translucent screen 8, causing the image 9 having the horizontal and vertical diameters 9a and 9b corresponding with the diameters 7a and 7b. The reflecting surface 10, because of its character causing horizontal distortion reflecting the image 9 produces the image 11 having the horizontal diameter 11a greater than the horizontal diameter 9a of the image 9, and the vertical diameter 11b the same as the vertical diameter 9b. Since the initial vertical distortion of the image 7 and the horizontal distortion of the reflecting surface 10 precisely correspond, it is obvious that the horizontal and vertical diameters 11a and 11b of the image 11 are identical, thus producing a circle, whereby the requisite horizontal distortion of the reflecting surface 11 has been compensated to produce a symmetrical image as observed by the eye E.

As illustrated in Fig. 3, the portion of a standard film 26 has the effective photographic field 27 in which are produced the three images 28 in the form of circles. As illustrated in Fig. 4, the portion of a standard film 29 has the effective field 30 of the same size as the field 27. By the use of the proper character of lens 31 producing vertical distortion, the six objects 32 are delineated in the field 29 as the vertically distorted images 33. As illustrated in Fig. 5, the images 33, each having the horizontal diameter 33a and the increased vertical diameter 33b, are projected upon the translucent screen 34 causing the images 35, each having the horizontal and vertical diameters 35a and 35b corresponding with the diameters 33a and 33b. The concave cylindrical reflecting surface 36 having a vertical axis, generated by a straight vertical line moving in an arcuate path disposed in a horizontal plane, with the chord of the arc of said surface at an angle to the plane of said screen, because of its character causing horizontal distortion, reflecting the images 35 produces the images 37, each having the horizontal diameter 37a greater than the horizontal diameter 35a of each of the images 35, and the vertical diameter 37b the same as the vertical diameter 35b. Since the lens 31 and the reflecting surface 36 are designed to effect the corresponding degrees of vertical and horizontal distortion respectively, it is obvious that the horizontal and vertical diameters 37a and 37b are identical, thus producing circles, as observed by the eye E.

As illustrated in Fig. 6, there are projected by the usual method on the screen 38 the three images 39 from the images 28 of the film 26. As illustrated in Fig. 7, there can be projected upon the surface 36, the six images 37 from the images 33 of the film 29. Thus it is obvious that by the use of my improved method, the field has been horizontally increased to project the images of not three objects but six, by the use of the same size film field, on a horizontally increased observed surface.

Having described my invention, what I claim is:

1. The method of producing stereoscopic pictures which comprises photographing objects, laterally increasing the photographic field by vertically distorting the picture to a determined degree; projecting the vertically distorted real picture upon a plane screen; and reflecting the said picture from a concave, cylindrical surface, placed, adjusted and disposed to produce a horizontally distorted virtual image to compensate the distortion of the photographic field, which surface by laterally and uniformly deviating the reflected light rays produces the required degree of horizontal parallax uniformly throughout the whole picture, to provide for observers at different lateral selected places laterally and parallelly displaced images, so that the binocular vision of each observer registers two images which are at the precise and uniform degree of lateral and parallel displacement to be perceived as a single image in any part of which appear the right distances of depth which existed between the objects when originally photographed.

2. A system of producing stereoscopic pictures, comprising means to photograph a wide lateral field by vertically distorting the pictures to a determined degree; a vertically disposed plane screen; means to project upon said screen the vertically distorted real pictures; means to compensate the said distortion and to secure the necessary uniform degree of horizontal parallax through the whole picture, comprising a concave, cylindrical reflecting surface, having a vertical axis, generated by a straight vertical line moving in an arcuate path disposed in a horizontal plane, with the chord of the arc of said surface at an acute angle to the plane of said screen, to cause the said reflecting surface to reflect the pictures to observers, distort horizontally the images thereof, and laterally and uniformly deviate their light rays to produce a lateral parallel displacement of the said images from different lateral points of view, the arc of curvature of the reflector being uniform throughout its entire height, and being adjusted wtih reference to the distance between the plane of the screen and the reflecting surface to symmetrically compensate the said vertical distortion, restore the length of the lateral visual field and provide identical images in that precise degree of lateral parallel displacement as to be perceived binocularly from selected places of observation as a single undistorted image having, throughout, the right distances of depth which existed between the objects when originally photographed.

CIRO FIDEL MENDEZ.